(12) United States Patent
Hatanaka et al.

(10) Patent No.: US 11,001,033 B2
(45) Date of Patent: May 11, 2021

(54) PREPREG LAMINATE AND FIBER-REINFORCED COMPOSITE MATERIAL, AND METHOD OF PRODUCING FIBER-REINFORCED COMPOSITE MATERIAL

(71) Applicant: Toray Industries, Inc., Tokyo (JP)

(72) Inventors: Kazuhiro Hatanaka, Nagoya (JP); Norio Nakagawa, Nagoya (JP); Hideki Nudeshima, Nagoya (JP); Hidehiro Takemoto, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/342,030

(22) PCT Filed: Oct. 23, 2017

(86) PCT No.: PCT/JP2017/038162
§ 371 (c)(1),
(2) Date: Apr. 15, 2019

(87) PCT Pub. No.: WO2018/079475
PCT Pub. Date: May 3, 2018

(65) Prior Publication Data
US 2019/0248107 A1  Aug. 15, 2019

(30) Foreign Application Priority Data
Oct. 26, 2016   (JP) .............................. JP2016-209461

(51) Int. Cl.
*B32B 5/26* (2006.01)
*B29C 70/28* (2006.01)
(Continued)

(52) U.S. Cl.
CPC ................ *B32B 5/26* (2013.01); *B29C 70/28* (2013.01); *B32B 5/28* (2013.01); *C08J 5/04* (2013.01);
(Continued)

(58) Field of Classification Search
CPC ................ B32B 5/26; B32B 2260/046; B32B 2260/023; B32B 2305/07; B32B 2305/073; B32B 2305/076
See application file for complete search history.

(56) References Cited

U.S. PATENT DOCUMENTS

2004/0009728 A1* 1/2004 Kubomura .............. B29C 70/22
442/205
2005/0194724 A1   9/2005 Krogager et al.
(Continued)

FOREIGN PATENT DOCUMENTS

JP    05-269909 A    10/1993
JP    2008-246981 A  10/2008
(Continued)

*Primary Examiner* — Jasper Saberi
(74) *Attorney, Agent, or Firm* — DLA Piper LLP (US)

(57) ABSTRACT

A fiber-reinforced composite material has an excellent design surface. The prepreg laminate includes at least prepregs [a] having reinforcing fibers impregnated with a resin, and a base material [b] not impregnated with a resin, wherein at least two of the prepregs [a] are stacked in succession, and both sides of the base material [b] are sandwiched by the prepregs [a].

6 Claims, 2 Drawing Sheets

(51) Int. Cl.
*B32B 5/28* (2006.01)
*C08J 5/04* (2006.01)
*B29K 307/04* (2006.01)
*B29K 309/08* (2006.01)

(52) U.S. Cl.
CPC ...... *B29K 2307/04* (2013.01); *B29K 2309/08* (2013.01); *B32B 2260/023* (2013.01); *B32B 2262/101* (2013.01); *B32B 2262/106* (2013.01); *B32B 2305/07* (2013.01); *B32B 2305/073* (2013.01); *B32B 2305/076* (2013.01); *B32B 2305/08* (2013.01)

(56) References Cited

U.S. PATENT DOCUMENTS

| | | | |
|---|---|---|---|
| 2006/0035548 A1* | 2/2006 | Goto | B32B 5/26 442/65 |
| 2011/0194942 A1 | 8/2011 | Whiter | |
| 2014/0309336 A1* | 10/2014 | Hughes | B32B 5/22 523/427 |
| 2015/0017853 A1* | 1/2015 | Perillat-Collomb | B29C 70/547 442/1 |
| 2015/0258712 A1* | 9/2015 | Moser | B32B 5/022 428/113 |
| 2016/0185072 A1* | 6/2016 | Wielander | B32B 27/32 428/112 |
| 2018/0043637 A1* | 2/2018 | Jones | B29C 70/083 |

FOREIGN PATENT DOCUMENTS

| | | |
|---|---|---|
| JP | 2016-027956 A | 2/2016 |
| WO | 02/18127 A1 | 3/2002 |
| WO | 2012/135754 A1 | 10/2012 |

\* cited by examiner

Fig. 4

PREPREG LAMINATE AND FIBER-REINFORCED COMPOSITE MATERIAL, AND METHOD OF PRODUCING FIBER-REINFORCED COMPOSITE MATERIAL

TECHNICAL FIELD

This disclosure relates to a fiber-reinforced composite material, a method of producing a fiber-reinforced composite material, and a prepreg laminate suitably used therein.

BACKGROUND

A fiber-reinforced composite material is useful because it is excellent in strength, rigidity, conductivity and the like. It is widely deployed in structural members for aircraft, blades of windmills, exterior materials for automobiles, interior materials for automobiles, computer applications, for example, IC trays and housings for laptop computers and the like, and the demand is increasing year by year.

The fiber-reinforced composite material is a material obtained by molding a prepreg containing, for example, reinforcing fibers and a resin as essential components. In using this material, it is known that a fiber-reinforced composite material obtained when air or volatile components remain in the resin portion of the prepreg before or during molding generates pinholes on the surface or voids in the interior. For that reason, various techniques have been proposed for the purpose of reducing pinholes on the surface or voids in the interior of the fiber-reinforced composite material obtained from the prepreg.

In one of the techniques, it has been proposed to mold a prepreg laminate by placing a base material not impregnated with a resin between prepreg layers having reinforcing fibers impregnated with a resin. For example, a technique has been proposed in which a molding material, sheet molding compound (SMC), and a nonwoven fabric not impregnated with a resin are press molded to yield a fiber-reinforced composite material (see Japanese Patent Laid-open Publication No. 2008-246981). Alternatively, a technique of a fiber-reinforced resin molded article formed by stacking a fiber mat not impregnated with a resin between materials for a prepreg having reinforcing fibers impregnated with a resin such as polypropylene has been proposed (see Japanese Patent Laid-open Publication No. H05-269909).

In those techniques, undulation of fibers due to fluidity is suppressed so that occurrence of irregularities on the surface of SMC molded article can be suppressed. As a result, surface smoothing of the fiber-reinforced composite material and prevention of generation of a layer made of only a resin during lamination molding are achieved so that the strength of laminate increases. Accordingly, the peel strength of fiber-reinforced composite material can be improved. However, even when a design is applied to the surface of the fiber-reinforced composite material, the desired design cannot be obtained. Hereinafter, the surface of the fiber-reinforced composite material to which design will be applied is referred to as a design surface.

It could therefore be helpful to provide a carbon fiber-reinforced composite material having an excellent design surface.

SUMMARY

We thus provide:

(1) A prepreg laminate, including prepregs [a] having reinforcing fibers impregnated with a resin, and a base material [b] not impregnated with a resin, wherein at least two of the prepregs [a] are stacked in succession, and both sides of the base material [b] are sandwiched by the prepregs [a].

(2) The above prepreg laminate, wherein at least one surface of the prepreg laminate is a design surface, and the base material [b] is stacked as a second layer or a third layer starting from the side of the design surface.

(3) Any one of the above prepreg laminates, wherein at least one surface of the prepreg laminate is a design surface, and at least one of the prepregs [a], the base material [b] and two or more of the prepregs [a] are stacked in succession in this order starting from the outermost layer on the side of the design surface.

(4) Any one of the above prepreg laminates, wherein the base material [b] has a basis weight of 5 to 100 g/m$^2$.

(5) Any one of the above prepreg laminates, wherein the base material [b] has a thickness of 0.1 to 1.5 mm.

(6) Any one of the above prepreg laminates, wherein the base material [b] includes carbon fibers or glass fibers, and the fibers are discontinuous.

(7) Any one of the above prepreg laminates, wherein the thickness of a prepreg structure [a1] defined below is 0.2 to 9 times the thickness of one prepreg [a2] defined below:

the prepreg structure [a1] is a structure that is laminated on one surface of the base material [b] and is composed of the prepregs [a] in which two or more of the prepregs [a] are stacked in succession;

the prepreg [a2] is one of the prepregs [a] laminated on another surface of the base material [b] (or a laminate of the prepregs [a] in a case where the prepregs [a] are stacked).

(8) Any one of the above prepreg laminates, wherein the thickness of the base material [b] is 0.1 to 3.0 times the thickness of a prepreg structure [a1] defined below. The prepreg structure [a1] is a structure that is laminated on one surface of the base material [b] and is composed of the prepregs [a] in which two or more of the prepregs [a] are stacked in succession.

(9) A fiber-reinforced composite material, including any one of the above prepreg laminates, and satisfying VfA>VfB, wherein VfA is the volume fraction of fiber of a fiber-reinforced composite material layer [A] derived from each of the prepregs [a], and VfB is the volume fraction of fiber of a fiber-reinforced composite material layer [B] derived from the base material [b].

(10) The fiber-reinforced composite materials, wherein the fiber-reinforced composite material layer [B] contains a resin, and the resin impregnated in the fiber-reinforced composite material layer [B] is derived from a resin impregnated in each of the prepregs [a].

(11) Any one of the above fiber-reinforced composite materials, wherein the volume fraction of fiber of the fiber-reinforced composite material layer [B] is 40% or less.

(12) Any one of the above fiber-reinforced composite materials, wherein each of the fiber-reinforced composite material layers [A] present on both sides of the fiber-reinforced composite material layer [B] has a volume fraction of fiber of 55% or more.

(13) Any one of the above fiber-reinforced composite materials, wherein the void content of the fiber-reinforced composite material layer [B] is higher than the void content of the fiber-reinforced composite material layer [A].

(14) Any one of the above fiber-reinforced composite materials, wherein 80 to 100% of voids contained in the fiber-reinforced composite material layer [B] are distributed in the center portion of a cut surface on a plane cut along the stacking direction in the prepreg laminate.

(15) A method of producing a fiber-reinforced composite material, including the step of heating and pressurizing any one of the above prepreg laminates for molding.

(16) The above methods of producing a fiber-reinforced composite material, further including performing any one of the steps for molding at a pressure of −80 kPa or less (gauge pressure).

(17) Any one of the above methods of producing a fiber-reinforced composite material, wherein in the heating and pressurizing step, a resin contained in each of the prepregs [a] is impregnated into the base material [b].

A fiber-reinforced composite material having an excellent design surface can thus be obtained.

DESCRIPTION OF REFERENCE SIGNS

1: Design surface
2: Group of prepregs [a]
2a1, 2a2, 2a3, 2b1 and 2b2: Prepreg [a]
3: Base material [b]
10: Prepreg laminate

DETAILED DESCRIPTION

Hereinafter, a description is made of examples with reference to the drawings. This disclosure is not limited to the Figs. or Examples.

The prepreg laminate includes two or more prepregs [a] having reinforcing fibers impregnated with a resin and one or more base materials [b] not impregnated with a resin. The laminate has a structure in which at least two prepregs [a] having reinforcing fibers impregnated with a resin are stacked in succession, and includes a structure in which both sides of the base material [b] are sandwiched by the prepregs [a].

Figure 1:
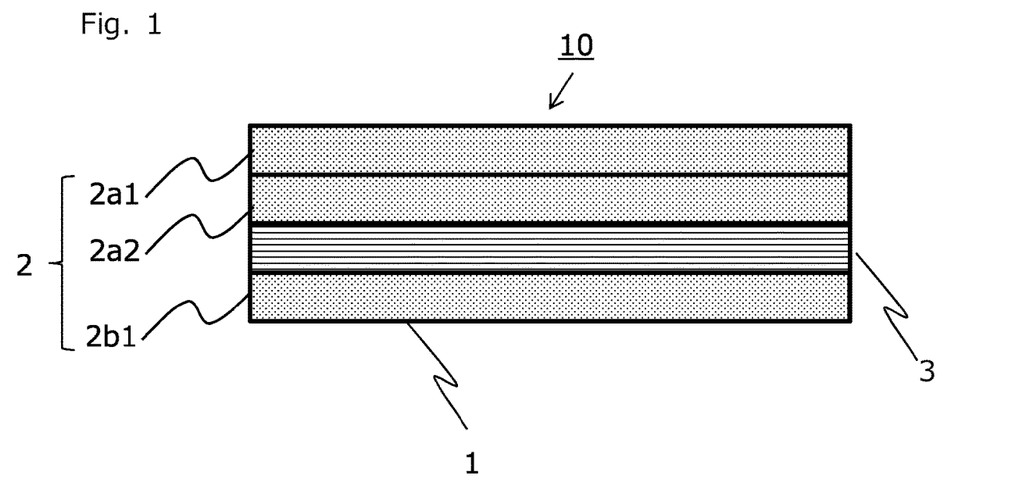
FIG. 1 is a schematic view of a prepreg laminate according to one example.

In the prepreg laminate 10 shown in FIG. 1, the prepregs [a] are disposed on both sides of the base material [b] 3 to sandwich the base material [b] 3. The upper side of the base material [b] 3 is provided with the prepreg [a] 2a2, on which prepreg [a] 2a2 the prepreg [a] 2a1 is further disposed. In such an adjacent arrangement, it can be said to be "successively." In addition, the lower side of the base material [b] 3 is provided with the prepreg [a] 2b1. The surface of the prepreg [a] 2b1 is a design surface 1.

When compressing the prepreg laminate 10 by press or the like, the resin impregnated in the prepregs [a] moves to the base material [b] 3 and is then impregnated among fibers contained in the base material [b] 3. Two layers of the prepreg [a] 2a1 and the prepreg [a] 2a2 are stacked in succession so that during heating and pressurizing for producing a fiber-reinforced composite material, the resin is impregnated from these prepregs [a] into the base material [b] 3, while air and volatile components contained in the prepregs [a] are transferred to the base material [b] 3, together with the resin contained in the prepreg [a] 2b1 having a design surface. Accordingly, a fiber-reinforced composite material having an excellent design surface 1 can be obtained.

The prepreg [a] contains at least reinforcing fiber and a resin.

The reinforcing fiber used in the prepreg [a] is not particularly limited, but may include the following:

metal fibers such as aluminum fiber, brass fiber, and stainless steel fiber;

carbon fibers such as PAN-based carbon fiber, rayon-based carbon fiber, lignin-based carbon fiber, and pitch-based carbon fiber;

graphite fiber; glass fiber;

organic fibers such as aramid fiber, PBO fiber, polyphenylene sulfide fiber, polyester fiber, acrylic fiber, nylon fiber, and polyethylene fiber; and inorganic fibers such as silicon carbide fiber and silicon nitride fiber.

In addition, these fibers may undergo a surface treatment. The surface treatment includes, in addition to a deposition treatment with metal as a conductor, a treatment with a coupling agent, treatment with a sizing agent, treatment with a banding agent, and adhesion treatment of additives.

One kind of these reinforcing fibers may be used alone, or two or more kinds thereof may be used in combination. Among them, from the viewpoint of weight reduction effect, carbon fibers such as PAN-based carbon fiber, pitch-based carbon fiber or rayon-based carbon fiber excellent in specific strength and specific rigidity are preferably used.

In addition, from the viewpoint of enhancing the economic efficiency of the obtained laminate, relatively inexpensive glass fiber is preferably used. In particular, from the viewpoint of balance between mechanical properties and economic efficiency, it is preferable to use carbon fiber and glass fiber in combination.

Furthermore, from the viewpoint of enhancing the shock absorption property of the obtained fiber-reinforced composite material and formativeness of the laminate, aramid fiber is also preferably used. In particular, from the viewpoint of balance between mechanical properties and shock absorption property, carbon fiber and aramid fiber are preferably used in combination.

In addition, from the viewpoint of enhancing the conductivity of the obtained fiber-reinforced composite material, reinforcing fiber coated with a metal such as nickel, copper, or ytterbium can also be used. Among them, PAN-based carbon fiber excellent in mechanical properties such as strength and elastic modulus can be more preferably used.

The form of the reinforcing fiber may be continuous or discontinuous. As long as the reinforcing fiber has a continuous form, any arrangement may be used. To yield a fiber-reinforced composite material that is lightweight and has higher durability, it is preferable that the reinforcing fiber have a continuous form such as filament, woven fabric, tow and roving aligned in one direction.

The weave of the woven fabric includes plain weave, twill weave and satin weave.

As long as the reinforcing fiber has a discontinuous form, from the viewpoint of easy compounding as a filler, reinforcing fiber having a fiber length of less than 15 mm is preferred.

The resin used in the prepreg [a] is not particularly limited, but examples thereof may include a thermosetting resin or a thermoplastic resin.

As the thermosetting resin, a thermosetting resin such as epoxy resin, phenol resin, vinyl ester resin, benzoxazine resin, polyimide resin, oxetane resin, maleimide resin, unsaturated polyester resin, urea resin, or melamine resin may be preferably used. A resin obtained by blending two or more of them may be used. Among them, from the viewpoint of mechanical properties and heat resistance of the laminate, epoxy resin, phenol resin, and vinyl ester resin are preferable. In particular, from the viewpoint of handling property in addition to mechanical properties and heat resistance of the laminate, an epoxy resin is more preferable. The epoxy resin is preferably contained as a main component of the resin to be used, because its excellent mechanical properties are exhibited. Specifically, the epoxy resin is preferably contained in an amount of 60% by mass or more per resin composition.

As the epoxy resin, an epoxy resin containing an amine, phenol, or compound having carbon-carbon double bond as a precursor is preferably used.

As a curing agent for the epoxy resin, any compound having an active group capable of reacting with the epoxy group can be used. As the curing agent, a compound having an amino group, acid anhydride group and azide group is suitable. Examples of the curing agent include various isomers of dicyandiamide, diaminodiphenylmethane and diaminodiphenylsulfone, aminobenzoates, various acid anhydrides, phenol novolak resins, cresol novolak resins, polyphenol compounds, imidazole derivatives, aliphatic amines, tetramethylguanidine, thiourea-added amines, carboxylic anhydrides such as methylhexahydrophthalic anhydride, carboxylic acid hydrazides, carboxylic acid amides, polymercaptans, and Lewis acid complexes such as an ethylamine boron trifluoride complex. These curing agents may be used alone or in any combination thereof.

Use of any of aromatic diamines as the curing agent makes it possible to yield a cured resin good in heat resistance. In particular, various isomers of diaminodiphenyl sulfone are most suitable for yielding a cured resin good in heat resistance. It is preferable that an added amount of aromatic diamine as the curing agent be stoichiometrically equivalent, but in some examples, when the equivalent ratio is about 0.7 to 0.8, a cured resin having high modulus of elasticity can be obtained.

Use of a combination of dicyandiamide in combination with a urea compound such as 3,4-dichlorophenyl-1,1-dimethylurea, or use of an imidazole as the curing agent provides high heat resistance and high water resistance while allowing for curing at a relatively low temperature. Use of an acid anhydride for curing yields a cured resin lower in water absorption, compared to a resin obtained with use of an amine compound for curing. In addition, one in which the curing agent is latescent, for example, a micro-encapsulated curing agent may be used.

Among the curing agents for epoxy resin, a combination of dicyandiamide with a urea compound is preferably used because it allows for curing within 10 minutes at a temperature of 145° C. or higher.

In addition, the composition is not limited to only a composition of the epoxy resin and the curing agent, but may include a composition into which a product obtained by preliminarily causing them partially to react with each other is incorporated. This manner is, in some cases, effective in adjusting the viscosity or improving the storage stability.

It is also suitable to dissolve a thermoplastic resin in the thermosetting resin for use. As such a thermoplastic resin, in general, a thermoplastic resin having a bond selected from carbon-carbon bond, amide bond, imide bond, ester bond, ether bond, carbonate bond, urethane bond, thioether bond, sulfone bond and carbonyl bond on the main chain is preferable.

The thermoplastic resin may have a partially crosslinked structure. In addition, the thermoplastic resin may be either crystalline or amorphous. Examples of the resin to be dissolved in the thermosetting resin include a polyamide resin, polycarbonate resin, polyacetal resin, polyphenylene oxide resin, polyphenylene sulfide resin, polyarylate resin, polyester resin, polyamide imide resin, polyimide resin, polyether imide resin, polyimide resin having a phenyl trimethyl indane structure, polysulfone resin, polyether sulfone resin, polyether ketone resin, polyether ether ketone resin, polyaramide resin, polyether nitrile resin, and polybenzimidazole resin.

The thermoplastic resin includes the following:
polyolefin resins such as polyethylene resin, polypropylene resin, and polybutylene resin;
polyester resins such as polyethylene terephthalate resin, polybutylene terephthalate resin, polytrimethylene terephthalate resin, polyethylene naphthalate resin, and liquid crystal polyester;
polyamide resin, polyoxymethylene resin; polyarylene sulfide resins such as polyphenylene sulfide resin; polyketone resin, polyether ketone resin, polyether ether ketone resin, polyether ketone ketone resin, polyether nitrile resin; fluororesins such as polytetrafluoroethylene resin, crystalline resins such as liquid crystal polymer resin;
amorphous resins such as polystyrene resin, polycarbonate resin, polymethyl methacrylate resin, polyvinyl chloride resin, polyphenylene ether resin, polyimide resin, polyamide imide resin, polyether imide resin, polysulfone resin, polyethersulfone resin, and polyarylate resin;
thermoplastic elastomer such as phenolic resin, phenoxy resin, polystyrene resin, polyolefin resin, polyurethane resin, polyester resin, polyamide resin, polybutadiene resin, polyisoprene resin, fluorinated resin, and polyacrylonitrile resin, and
thermoplastic resins selected from copolymers or modified products thereof.

Among them, from the viewpoint of lightness of the obtained laminate, a polyolefin resin is preferable, from the viewpoint of strength, a polyamide resin is preferable, and from the viewpoint of surface appearance, a polyester resin is preferably used.

The resin to be impregnated into the prepreg [a] may additionally contain an impact-resistance improver such as an elastomer or rubber component, another filler or additive, as long as the desired effect is not impaired. Examples include an inorganic filler, flame retardant, conductivity imparting agent, crystal nucleating agent, ultraviolet light absorber, antioxidant, vibration suppressing agent, antibacterial agent, insect repellent, deodorant, coloring inhibitor, heat stabilizer, release agent, antistatic agent, plasticizer, lubricant, colorant, pigment, dye, foaming agent, defoaming agent, and coupling agent.

An additional filler may be included. The filler includes calcium carbonate, talc, silica, clay, glass flake, catechin, zeolite, silica balloon, glass balloon, shirasu balloon, carbon black, carbon nanotube, fullerene, graphite, metal powder, metal foil, ferrite material, alumina, barium titanate, lead zirconate titanate, barium sulfate, titanium oxide, glass beads, alumina, antimony oxide, hydrotalcite, red phosphorus, zinc carbonate, and calcium oxide. Among them, from the viewpoint of moldability, an intermediate base material containing continuous reinforcing fibers is preferable.

The base material [b] used in the prepreg laminate preferably contains fibers because they are easily impregnated with the resin during molding.

The fibers that can be used in the base material [b] include the following:

metal fibers such as aluminum fiber, brass fiber, and stainless steel fiber;

carbon fibers such as PAN-based carbon fiber, rayon-based carbon fiber, lignin-based carbon fiber, and pitch-based carbon fiber; graphite fiber, glass fiber;

organic fibers such as aramid fiber, PBO fiber, polyphenylene sulfide fiber, polyester fiber, acrylic fiber, nylon fiber, and polyethylene fiber; and inorganic fibers such as silicon carbide fiber and silicon nitride fiber.

In addition, these fibers may undergo a surface treatment. The surface treatment includes, in addition to a deposition treatment with metal as a conductor, a treatment with a coupling agent, treatment with a sizing agent, treatment with a banding agent, and adhesion treatment of additives. One kind of these reinforcing fibers may be used alone, or two or more kinds thereof may be used in combination. Among them, from the viewpoint of weight reduction effect, carbon fibers such as PAN-based carbon fiber, pitch-based carbon fiber or rayon-based carbon fiber excellent in specific strength and specific rigidity are preferably used.

In addition, from the viewpoint of enhancing the economic efficiency of the obtained prepreg laminate, relatively inexpensive glass fiber is preferably used. In particular, from the viewpoint of balance between mechanical properties and economic efficiency, carbon fiber and glass fiber are preferably used in combination.

Furthermore, from the viewpoint of enhancing the shock absorption property of the obtained fiber-reinforced composite material and formativeness of the laminate, aramid fiber is preferably used. Moreover, from the viewpoint of balance between mechanical properties and shock absorption property, it is preferable to use carbon fiber and aramid fiber in combination. In addition, from the viewpoint of enhancing the conductivity of the obtained fiber-reinforced composite material, reinforcing fiber coated with a metal such as nickel, copper, or ytterbium can also be used. Among them, PAN-based carbon fiber excellent in mechanical properties such as strength and elastic modulus, and from the viewpoint of enhancing the economic efficiency of the obtained laminate, glass fiber can be more preferably used.

The base material [b] may be any one as long as it is not impregnated with a resin, and examples of the form include nonwoven fabric, woven fabric, knit fabric, and mat.

The weave of the woven fabric includes plain weave, twill weave and satin weave.

The base material [b] is preferably one containing carbon fiber or glass fiber. Furthermore, it is preferable that the fibers be discontinuous. It is possible to yield a fiber-reinforced composite material excellent in strength and elastic modulus when the base material containing carbon fiber is used, and a fiber-reinforced composite material excellent in economic efficiency when the base material containing glass fiber is used. The base material in which fibers are discontinuous is preferable because the thickness of the base material can be adjusted to be smaller or larger in a wide range, and thus the thickness of the fiber-reinforced composite material to be obtained can also be adjusted.

In addition, the prepreg laminate preferably has a structure in which at least one surface of the prepreg laminate is the design surface 1, and the base material prepreg [a] is laminated as the outermost layer on the side of the design surface 1, and the base material prepregs [a] are stacked up to the second or third layer, in that pinholes on the design surface of the obtained fiber-reinforced composite material are suppressed.

Figure 2:
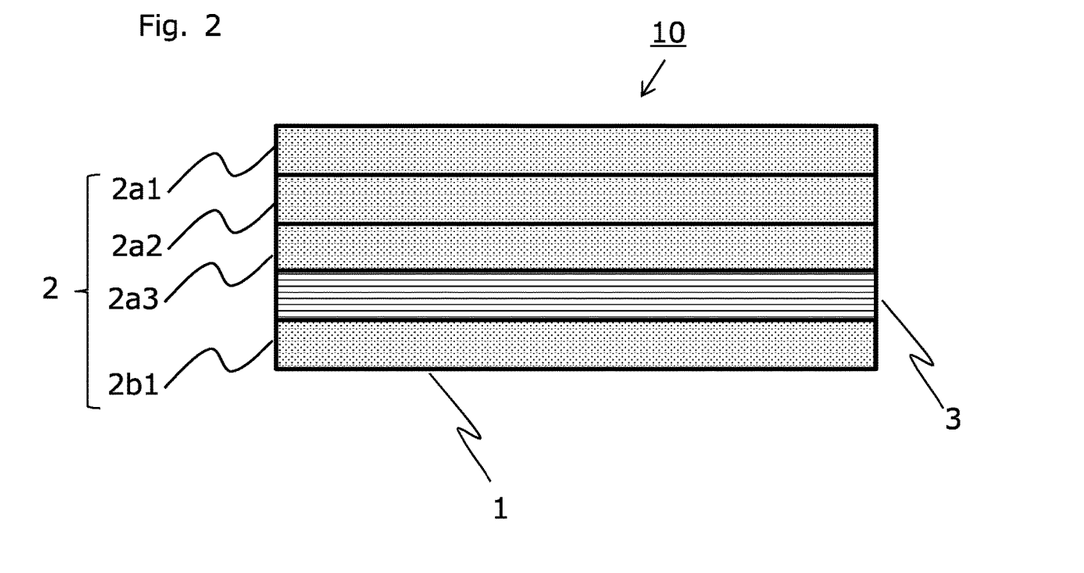
FIG. 2 is a schematic view of a prepreg laminate according to another example.

As shown in FIGS. 1 and 2, the prepreg laminate 10 has a structure in which, starting from the design surface 1, the prepreg [a] 2$b$1 is disposed, followed by the base material [b] 3. Accordingly, air and volatile components in the prepreg [a] 2$b$1 that becomes the design surface 1 are impregnated and moved together with the resin into the base material [b] 3. As a result, an excellent design surface of the fiber-reinforced composite material can be obtained. In other words, the prepreg laminate preferably has a structure in which at least one surface becomes a design surface, and the prepreg [a], base material [b], and two or more prepregs [a] that are stacked in succession are disposed in this order starting from the side of the design surface, in that pinholes on the design surface of the obtained fiber-reinforced composite material are suppressed.

Figure 3:
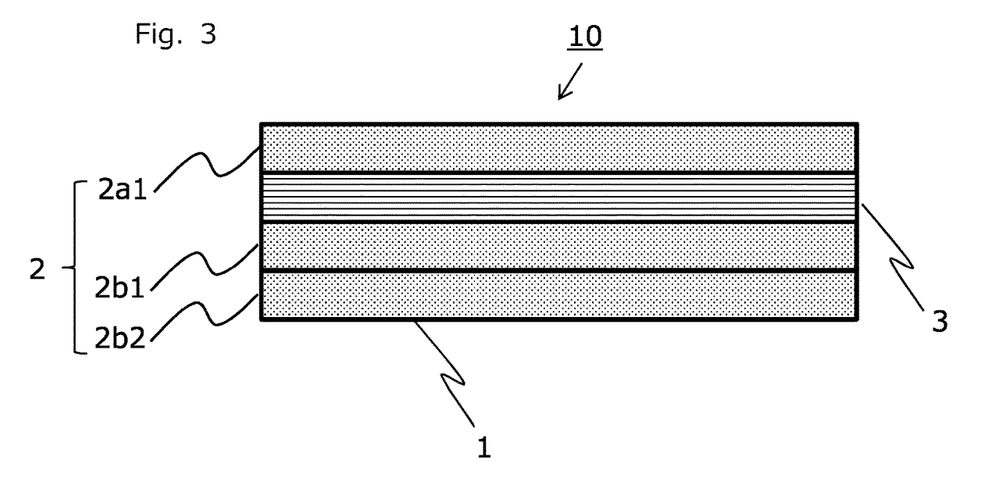
FIG. 3 is a schematic view of a prepreg laminate according to another example.
Figure 4:
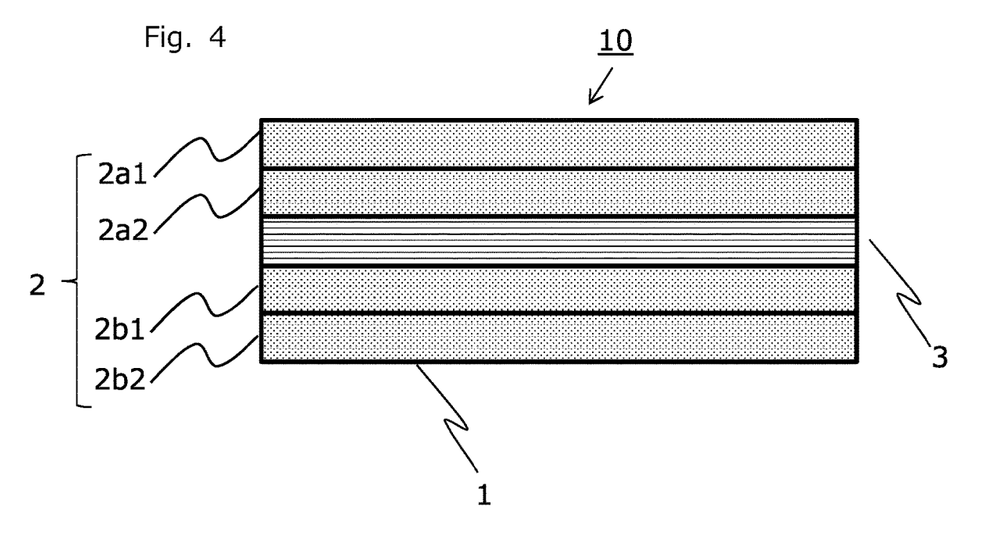
FIG. 4 is a schematic view of a prepreg laminate according to another example.

As shown in FIGS. 3 and 4, the prepreg [a] 2$b$2 and prepreg [a] 2$b$1 are disposed in this order starting from the design surface to be two layers of the prepregs [a]. Furthermore, the base material [b] 3 can be disposed on the prepreg [a] 2$b$1 to yield the prepreg laminate 10. This structure is preferable in that the stacking process is not complicated, and air and volatile components in the prepreg [a] 2$b$1 that provides the design surface 1 leach out together with the resin into the base material [b] 3 so that an excellent design surface 1 of the fiber-reinforced composite material is obtained.

Furthermore, as shown in FIG. 4, a prepreg laminate 10 is also a preferred example in which the prepreg [a] 2$a$2 and prepreg [a] 2$a$1 are further stacked in this order on the base material [b] 3 so that the total number of layers of the prepregs [a] is large. The prepreg laminate 10 in FIG. 4 has a structure in which the prepreg [a] 2$a$2 and prepreg [a] 2$a$1 are disposed in this order on one side of the base material [b] 3, and the prepreg [a] 2$b$1 and prepreg [a] 2$b$2 are arranged in this order on another side.

The basis weight of the base material [b] used in the prepreg laminate is preferably 5 to 100 $g/m^2$. This makes it possible to improve both moldability of the prepreg laminate and design of the fiber-reinforced composite material. The basis weight is more preferably 5 to 80 $g/m^2$, still more preferably 5 to 50 $g/m^2$, further preferably 5 to 35 $g/m^2$.

When the basis weight is small, pinholes may increase on the design surface of the obtained fiber-reinforced composite material, while when it exceeds 100 $g/m^2$, impregnation of the resin into the base material [b] becomes insufficient during molding. In this way, problems may arise in mechanical properties of the obtained fiber-reinforced composite material.

The thickness of the base material [b] included in the prepreg laminate is preferably 0.1 to 1.5 mm. This makes it possible to improve both impregnation of the resin into the base material [b] and design of the fiber-reinforced composite material. The thickness is more preferably 0.1 to 1 mm, still more preferably 0.1 to 0.5 mm. When the thickness is less than 0.1 mm, pinholes may increase on the design surface of the obtained fiber-reinforced composite material, while when it exceeds 1.5 mm, problems may arise in mechanical properties of the obtained fiber-reinforced composite material.

In addition, in the prepreg laminate, the thickness of a prepreg structure [a1] defined below is preferably 0.2 to 9 times the thickness of one prepreg [a2] defined below.

The prepreg structure [a1] is a structure laminated on one surface of the base material [b] and is composed of the prepregs [a] in which two or more of the prepregs [a] are stacked in succession.

The prepreg [a2] is the prepreg [a] laminated on another surface of the base material [b] (or a laminate of prepregs [a] when the prepregs [a] are stacked).

The ratio of thickness makes it possible to improve both impregnation into the base material [b] 3 and design of the fiber-reinforced composite material. The thickness is more preferably 0.5 to 5 times, still more preferably 1 to 3 times.

In addition, in the prepreg laminate 10, the thickness of the base material [b] is preferably 0.1 to 3.0 times the thickness of the prepreg structure [a1]. This makes it possible to improve both impregnation into the base material [b] 3 and design of the fiber-reinforced composite material. The thickness is more preferably 0.2 to 2 times, still more preferably 0.5 to 1 time.

Two or more kinds of prepregs [a] different in composition may be used for the prepreg laminate. It is possible to design the prepreg laminate depending on mechanical properties required by the fiber-reinforced composite material, thickness of the fiber-reinforced composite material or the like.

When the prepreg laminate has a structure in which two or more prepregs [a] having reinforcing fibers impregnated with the resin are stacked in succession, even after the resin is impregnated from the prepreg [a] into the base material [b] through molding operation, the void content is so low that the fiber-reinforced composite material is excellent in mechanical properties such as strength. In addition, the material has a design surface with few pinholes.

On the other hand, in a laminate in which a resin-containing prepreg is not stacked, but a prepreg and a base material not impregnated with a resin are alternately stacked to provide a resin for the prepreg to be impregnated into a base material, the volume fraction of fiber of the fiber-reinforced composite material increases, and the void content tends to be high. In addition, pinholes on the design surface may occur.

In general, a prepreg laminate is obtained by stacking prepregs depending on the mechanical properties, thickness and the like of a desired fiber-reinforced composite material. When using unidirectional prepregs, because a fiber-reinforced composite material exhibits anisotropy, it is possible to take countermeasures such as quasi-isotropic lamination.

Next, a description is made of the fiber-reinforced composite material. All of the fiber-reinforced composite materials include a fiber-reinforced composite material layer [A] derived from a prepreg [a] having reinforcing fibers impregnated with the resin, and a fiber-reinforced composite material layer [B] derived from a base material [b] not impregnated with a resin.

In the fiber-reinforced composite material layer [A] of the fiber-reinforced composite material, the resin in the prepreg [a] is cured or solidified.

In the fiber-reinforced composite material layer [B] of the fiber-reinforced composite material, a part of the resin in the prepreg [a] is impregnated into the base material [b], and then the resin is cured or solidified in the base material [b].

The fiber-reinforced composite material preferably satisfies VfA>VfB, wherein VfA is the average of volume fraction of fiber of the fiber-reinforced composite material layer [A], and VfB is the volume fraction of fiber of the fiber-reinforced composite material layer [B].

It is further preferable that VfA be 55% or more and VfB be 40% or less, from the viewpoint of design of the fiber-reinforced composite material.

In the fiber-reinforced composite material, a resin impregnated in the fiber-reinforced composite material layer [B] is derived from the resin impregnated in the prepreg [a]. As a result, during molding, air and volatile components contained in the prepreg [a] of the design surface move to the base material [b] together with the resin so that a fiber-reinforced composite material having an excellent design surface can be obtained.

In the fiber-reinforced composite material, it is preferable that each of the fiber-reinforced composite material layers [A] on both sides between which the fiber-reinforced composite material layer [B] is sandwiched have a volume fraction of fiber of 55 to 90%. As a result, the mechanical properties and design of the fiber-reinforced composite material are excellent. The volume fraction of fiber is preferably 60 to 90%, more preferably 70 to 80%. When the volume fraction of fiber is small, a resin layer contained in the fiber-reinforced composite material layer [A] increases so that air and volatile components are less likely to move to the fiber-reinforced composite material layer [B]. Accordingly, design of the fiber-reinforced composite material may not be sufficiently achieved.

The volume fraction of fiber of the fiber-reinforced composite material layer [B] is preferably 1 to 40%, from the viewpoint of impregnation of the resin in the prepreg. The volume fraction of fiber thereof is more preferably 2 to 30%, still more preferably 2 to 10%.

In the fiber-reinforced composite material, it is preferable that the void content of the fiber-reinforced composite material layer [B] be higher than the average of void content of the layers in the fiber-reinforced composite material layer [A], from the view point of improving design of the fiber-reinforced composite material.

In addition, it is preferable that 80 to 100% of voids in the fiber-reinforced composite material layer [B] be distributed in the center portion of the fiber-reinforced composite material layer [B] on a plane cut along the stacking direction of the prepregs [a] and the base material [b]. This is because adhesion increases between the layers in the obtained fiber-reinforced composite material.

Next, a description is made of a method of producing a fiber-reinforced composite material. The method of producing a fiber-reinforced composite material includes the step of heating and pressurizing the prepreg laminate described above for molding.

In the method of producing a fiber-reinforced composite material, in the step of forming the prepreg laminate and the step of impregnating the resin contained in the prepreg [a] into the base material [b] for molding, it is further preferable to include a step performed under reduced pressure. This is because design of the obtained fiber-reinforced composite material becomes excellent. The reduced pressure allows air and volatile components remaining near the design surface of the prepreg laminate to be removed. As a result, it is possible to yield a fiber-reinforced composite material having a more excellent design surface. The reduced pressure is a pressure of −80 kPa or less, preferably −90 kPa or less, more preferably −95 kPa or less in gauge pressure notation.

In the method of producing a fiber-reinforced composite material, when the base material [b] is impregnated with the resin contained in the prepreg [a], it is preferable that air and volatile components contained in the resin move to the base material [b]. As a result, it is possible to yield a fiber-reinforced composite material having a more excellent design surface with few pinholes.

Examples of the method of producing a fiber-reinforced composite material include press molding using a mold, vacuum bag molding, and autoclave molding. Among them, a producing method by autoclave molding is preferable, because a fiber-reinforced composite material having an excellent design surface can be obtained. The molding pressure in the autoclave molding is preferably 0.1 MPa to 1.0 MPa, or from the viewpoint that pinholes on the design surface can be removed, more preferably 0.3 MPa to 0.6 MPa. The molding temperature in the autoclave molding is required to be set depending on the curing temperature of the resin used in the prepreg, but is usually 100° C. to 200° C.

On the design surface of the obtained fiber-reinforced composite material, a coating treatment such as clear coating or colored coating, pasting of a film and the like are applied. Because the fiber-reinforced composite material has a design surface with few pinholes, the effect remarkably appears through the coating treatment.

Applications of such a fiber-reinforced composite material include the following.

Electrical or electronic equipment parts such as a housing for personal computer, display, office equipment, mobile phone, portable information terminal, facsimile, compact disc, portable MD, portable radio cassette, PDA (portable information terminal such as electronic notebook), video camera, digital video camera, optical equipment, audio, air conditioner, lighting equipment, amusement tool, toy, and other home appliance, tray, chassis, interior member, or its case.

Parts for civil engineering and constructing material such as a support, panel or reinforcing material. Suspension, accelerator or steering parts such as various members, various frames, various hinges, various arms, various axles, various bearings for wheel, various beams, a propeller shaft, wheel or gear box.

Outside plates or body parts such as a hood, roof, door, fender, trunk lid, side panel, rear end panel, upper back panel, front body, underbody, various pillars, various members, various frames, various beams, various supports, various rails or various hinges.

Exterior parts such as a bumper, bumper beam, molding, undercover, engine cover, straightening board, spoiler, cowl louver or aero part.

Interior parts such as an instrument panel, seat frame, door trim, pillar trim, handle or various modules.

Structural parts for fuel system, exhaust system and intake system of automobile or motorcycle such as a motor component, CNG tank, gas tank, fuel pump, air intake, intake manifold, carburetor main body, carburetor spacer, various piping or various valves.

Various parts for automobile and motorcycle such as an alternator terminal, alternator connector, IC regulator, potentiometer base for light dimmer, engine-cooling water joint, thermostat base for air conditioner, hot air flow-control valve, brush holder for radiator motor, turbine vane, wiper motor-related component, distributor, starter switch, starter relay, window washer nozzle, air conditioner panel switch substrate, coil for fuel-related electromagnetic valve, battery tray, AT bracket, head lamp support, pedal housing, protector, horn terminal, step motor rotor, lamp socket, lamp reflector, lamp housing, brake piston, noise shield, spare tire cover, solenoid bobbin, engine oil filter, ignition case, scaff plate, or fascia.

Parts for aircraft such as a landing gear pod, winglet, spoiler, edge, ladder, elevator, failing, or rib.

From the viewpoint of mechanical properties, the fiber-reinforced composite material is preferably used for interior and exterior decoration of automobiles, housings for electrical or electronic equipment, bicycles, structural materials for sports articles, interior materials for aircraft, or boxes for transportation.

EXAMPLES

Hereinafter, a more specific description is made with reference to Examples.
This disclosure is not limited to the Examples.
Prepreg [a] Having Reinforcing Fibers Impregnated with Resin A method of producing a prepreg A that is a prepreg [a] is shown below.
Epoxy Resin Composition In a compounding apparatus, with 35 parts by mass of "jER" (registered trademark) 4007P (made by Japan Epoxy Resins Co., Ltd.), 35 parts by mass of triglycidyl-p-aminophenol ("Araldite" (registered trademark) MY0510 (made by Huntsman Advanced Materials)) and 30 parts by mass of a bisphenol F type epoxy resin ("Epiclon" (registered trademark) 830 (made by DIC Corporation)), 3 parts by mass of "Vinylec" (registered trademark) PVF-K (polyvinyl formal) (made by Chisso Corporation) was blended, followed by dissolution of a thermoplastic resin (PVF-K) in an epoxy resin. Thereafter, 5 parts by mass of a curing agent, dicyandiamide (curing agent, DICY-7, made by Mitsubishi Chemical Corporation) and 3 parts by mass of DCMU99 (3-(3,4-dichlorophenyl)-1,1-dimethylurea, curing accelerator (made by Hodogaya Chemical Co., Ltd.) were compounded to prepare an epoxy resin composition.
Carbon Fiber A A copolymer composed of 99 mol % acrylonitrile and 1 mol % itaconic acid was spun and baked to yield carbon fiber having a total filament number of 3,000, a specific gravity of 1.8, a strand tensile strength of 3.5 GPa and a strand tensile modulus of elasticity of 230 GPa. Next, the carbon fiber was electrolytically surface-treated using a water solution of sulfuric acid having a concentration of 0.05 mol/L as an electrolyte at an electrical quantity of 3 coulombs per 1 g of carbon fiber. The electrolytically surface-treated carbon fiber was subsequently washed with water, and then dried in heated air at a temperature of 150° C. to yield carbon fiber as a raw material. Then, "jER (registered trademark)" 825 (made by Japan Epoxy Resins Co., Ltd.) was mixed with acetone to yield about 1 mass % solution uniformly dissolved in acetone. This acetone solution was applied to the carbon fiber surface-treated by a dipping method, followed by heat treatment at a temperature of 210° C. for 180 seconds, to yield sizing agent-applied carbon fiber. The attached amount of sizing agent was adjusted to be 0.5 parts by mass with respect to 100 parts by mass of the surface-treated carbon fiber.
Method of Producing Prepreg A A knife coater was used to apply the prepared epoxy resin composition onto each of release paper pieces. In this way, two resin films having 66 g/m² were prepared. On the other hand, a carbon fiber sheet A having a basis weight of 198 g/m² was prepared, in which the carbon fibers A were arranged in a sheet form in a bidirectional cross of twill weave. Two of the resin films prepared above were overlapped on both sides of the carbon fiber sheet A, followed by impregnation with a resin under heating and pressurizing condition, to prepare a cloth prepreg having a mass fraction of matrix resin of 40.0%, a basis weight of 330 g/m$^2$, and a thickness of 0.22 mm.

Base Material [b] not Impregnated with Resin

The following base materials A, B and C to become a base material [b] were prepared:

Base material A: "Torayca (registered trademark)" Cloth C06151B (made by Toray Industries, Inc.) (basis weight: 92 g/m$^2$, thickness: 0.11 mm)

Base material B: "Torayca (registered trademark)" Cloth C06343B (made by Toray Industries, Inc.)) (basis weight: 198 g/m$^2$, thickness: 0.25 mm)

Base material C: Surface mat, FC-30S (made by Central Glass Fiber Co., Ltd.) (basis weight: 30 g/m$^2$, thickness: 0.23 mm).

A method of measuring the volume fraction of fiber of the prepreg [a], base material [b] or fiber-reinforced composite material used in Examples, a method of measuring the void content of the fiber-reinforced composite material, a method of measuring void distribution in the fiber-reinforced composite material layer [B], and a method of measuring pinholes on the design surface are described below. The production and evaluation of the prepreg laminate and fiber-reinforced composite material of Examples were performed in an atmosphere at a temperature of 25° C.±2° C. and a relative humidity of 50% unless otherwise specified.

(1) Volume Fraction of Fiber for Fiber-Reinforced Composite Material Layer [A] and Fiber-Reinforced Composite Material Layer [B] in Fiber-Reinforced Composite Material From the fiber-reinforced composite material obtained in each Example, samples of 20 mm in length×20 mm in width were cut out in a plane direction perpendicular to the stacking direction, and the cross section of each sample was polished. Then, the cross section was enlarged 200 times or more for photographing through a laser microscope (KEYENCE VK-9510) such that two or more layers were within a field of view. By the same operation, 10 sites were randomly selected for each layer, and the thickness of each layer was measured. From the thickness of each layer, basis weight of fiber and fiber specific gravity, the volume fraction of fiber for each layer was determined. The average value of volume fraction of fiber of the fiber-reinforced composite material layer [A] of the sample, and the average value of the fiber-reinforced composite material layer [B] were determined. This was carried out for a total of 6 samples, and the average value for 6 samples was taken as the volume fraction of fiber.

(2) Void Content of Fiber-Reinforced Composite Material

The cross section of each sample of 20 mm in length×20 mm in width was photographed under the same condition as in (1). From the photograph of each layer, binarization of a void portion and the other portions was performed to calculate the void content of the fiber-reinforced composite material.

(3) Void Distribution in Fiber-Reinforced Composite Material Layer [B]

The cross section of the fiber-reinforced composite material obtained in each Example was photographed under the same condition as in (1), and voids inside the fiber-reinforced composite material were checked. When 80 to 100% of void area on the whole cut surface was distributed in the central portion of the cut surface of the fiber-reinforced composite material layer [B] was evaluated as A, and when less than 80% of voids were distributed in the central portion was evaluated as B. The central portion of the cut surface represents 80% area portion of the whole area including the center of gravity having the shape of the whole area of the whole cut surface reduced to 80%.

(4) Pinhole on Design Surface

The fiber-reinforced composite material prepared in (1) was cut out in a length of 100 mm×width of 100 mm. The obtained sample was visually checked for pinhole on the design surface. A judgment criterion is adopted, in which when the number of pinholes was 10 or less was evaluated as A$^+$, when the number thereof was 11 or more and 30 or less was evaluated as A, and when the number thereof was 31 or more was evaluated as B.

Example 1

As shown in Table 1, the prepreg A was used as a material for the prepreg [a], and the base material A was used as the base material [b], and four layers of the prepreg A, base material A, first prepreg A and second prepreg A were stacked in this order starting from the design surface, to prepare a prepreg laminate. The prepreg A under the design surface corresponds to the prepreg structures [a2], and a stacked structure composed of the first prepreg A and the second prepreg A corresponds to the prepreg [a1] structure.

The obtained prepreg laminate was molded in an autoclave at a temperature of 130° C. under a pressure of 0.5 MPa with a rate of temperature increase of 1.6° C./minute for 2 hours to prepare a fiber-reinforced composite material. The volume fraction of fiber of the fiber-reinforced composite material, void content of fiber-reinforced composite material, void distribution in the fiber-reinforced composite material layer [B], and measurement result of pinholes on the design surface are shown in Table 1.

Examples 2 and 3

A prepreg laminate was prepared in the same manner as in Example 1, except that the material for the base material [b] was changed to those shown in Table 1. The measurement results of the prepared prepreg laminate are shown in Table 1.

Examples 4 to 6

The prepreg A was used as a material for the prepreg [a], and the base material A was used as the base material [b], to prepare a prepreg laminate composed of a plurality of the prepregs A and the base material A in the same order starting from the design surface as shown in Table 1. The measurement results are shown in Table 1.

Comparative Examples 1 to 4

The prepreg A was used as a material for the prepreg [a], and the base material B or base material C was used as the base material [b], to prepare a prepreg laminate composed of a plurality of the prepregs A and the base material B or base material C in the same order starting from the design surface as shown in Table 1. In Comparative Example 1, the base material [b] not impregnated with the resin was not used. The measurement results are shown in Table 2.

TABLE 1

A

Prepreg laminate

| Example | Prepreg [a] Material | Prepreg [a] Thickness (mm) | Base material [b] Material | Base material [b] Basis weight (g/m²) | Base material [b] Thickness (mm) | Stacked structure starting from design surface | Ratio of thickness of prepreg structure [a1]/prepreg [a2] | Thickness of base material [b]/(sum of thicknesses of prepregs in which two or more prepregs [a] are stacked in succession) |
|---|---|---|---|---|---|---|---|---|
| 1 | Prepreg A | 0.22 | Base material A | 92 | 0.11 | Prepreg A/base material A/prepreg A | 2 | 0.25 |
| 2 | Prepreg A | 0.22 | Base material B | 198 | 0.25 | Prepreg A/base material B/prepreg A | 2 | 0.57 |
| 3 | Prepreg A | 0.22 | Base material C | 30 | 0.23 | Prepreg A/base material C/prepreg A | 2 | 0.52 |
| 4 | Prepreg A | 0.22 | Base material A | 92 | 0.11 | Prepreg A/base material A/prepreg A/prepreg A | 3 | 0.17 |
| 5 | Prepreg A | 0.22 | Base material A | 92 | 0.11 | Prepreg A/prepreg A/base material A/prepreg A | 2 | 0.25 |
| 6 | Prepreg A | 0.22 | Base material A | 92 | 0.11 | Prepreg A/prepreg A/base material A/prepreg A/prepreg A | 1 | 0.25 |

B

Fiber-reinforced composite material

| Example | Volume fraction of fiber (%) VfA Fiber-reinforced composite material layers [A] (average for two layers) between which base material [b] is sandwiched | Volume fraction of fiber (%) VfA Fiber-reinforced composite material layer [A] not adjacent to base material [b] | VfB Fiber-reinforced composite material layer [B] | Void content (%) Fiber-reinforced composite material layers [A] (average for two layers) between which base material [b] is sandwiched | Void content (%) Fiber-reinforced composite material layer [A] not adjacent to base material [b] | Fiber-reinforced composite material layer [B] | Void distribution in fiber-reinforced composite material layer [B] | Pinhole on design surface |
|---|---|---|---|---|---|---|---|---|
| 1 | 64.7 | 61.1 | 46.5 | 0.9 | 1.1 | 3.5 | A | A |
| 2 | 64.7 | 61.1 | 44 | 0.7 | 1.2 | 3.3 | A | A |
| 3 | 68.8 | 62.9 | 6.9 | 0.8 | 1.1 | 2.5 | A | A⁺ |
| 4 | 64.7 | 61.1 (Average for two layers) | 46.5 | 0.7 | 1.3 (Average for two layers) | 3.5 | A | A |
| 5 | 64.7 | 61.1 | 46.5 | 0.7 | 1.4 | 3.8 | A | A |
| 6 | 64.7 | 61.1 (Average for two layers) | 46.5 | 0.6 | 1.2 (Average for two layers) | 3.7 | A | A |

TABLE 2

A

| | Prepreg laminate | | | | | |
|---|---|---|---|---|---|---|
| | Prepreg [a] | | Base material [b] | | | |
| Comparative Example | Material | Thickness (mm) | Material | Basis weight (g/m²) | Thickness (mm) | Stacked structure starting from design surface |
| 1 | Prepreg A | 0.22 | — | — | — | Prepreg A/prepreg A/ prepreg A/prepreg A |
| 2 | Prepreg A | 0.22 | Base material B | 198 | 0.25 | Prepreg A/base material B/prepreg A/ base material B/prepreg A |
| 3 | Prepreg A | 0.22 | Base material B | 198 | 0.25 | Prepreg A/base material B/base material B/prepreg A/base material B/base material B/prepreg A |
| 4 | Prepreg A | 0.22 | Base material C | 30 | 0.23 | Prepreg A/base material C/prepreg A/base material C/prepreg A |

B

| | Fiber-reinforced composite material | | | | | | | |
|---|---|---|---|---|---|---|---|---|
| | Volume fraction of fiber (%) | | | Void content (%) | | | Void distribution | |
| | VfA | | VfB | | | | | |
| Comparative Example | Outer fiber-reinforced composite material layer [A] | Inner fiber-reinforced composite material layer [A] | Fiber-reinforced composite material layer [B] | Outer fiber-reinforced composite material layer [A] | Inner fiber-reinforced composite material layer [A] | Fiber-reinforced composite material layer [B] | in fiber-reinforced composite material layer [B] | Pinhole on design surface |
| 1 | 61.1 (Average for two layers) | 61.1 (Average for two layers) | — | 1.1 (Average for two layers) | 1.1 (Average for two layers) | — | B | B |
| 2 | 79.5 (Average for two layers) | 66.8 | 43.8 (Average for two layers) | 4.5 (Average for two layers) | 3.2 | 3.3 | B, B (Observed for two layers) | B |
| 3 | 85.2 (Average for two layers) | 67.2 | 43.8 (Average for four layers) | 5.8 (Average for two layers) | 4.7 | 4.1 | B, B, B, B (Observed for four layers) | B |
| 4 | 80.5 (Average for two layers) | 68.8 | 7.2 (Average for two layers) | 5.1 (Average for two layers) | 2.8 | 2.5 | B, B (Observed for two layers) | B |

By comparison between Examples 1 to 6 and Comparative Examples 1 to 4, our fiber-reinforced composite material has an excellent design surface. This is because, when a resin is impregnated into the base material not impregnated with a resin, air and volatile components that cause pinholes on the design surface are transferred together with the resin from the prepreg to the base material not impregnated with a resin. In addition, because the void content of our fiber-reinforced composite material is low, it can be expected that the fiber-reinforced composite material also has excellent mechanical properties.

INDUSTRIAL APPLICABILITY

Because a fiber-reinforced composite material having an excellent design surface can be obtained, the fiber-reinforced composite material is widely deployed in sports articles such as tennis rackets and golf shafts, exterior materials for automobiles such as bumpers and doors, structural materials for automobiles such as chassis and front side members, interior materials for automobiles such as steering and meter visors, structural members for aircraft, blades of windmills, computer applications such as IC trays and housings for laptop computers or the like, and thus useful.

The invention claimed is:

1. A fiber-reinforced composite material comprising a prepreg laminate comprising prepregs (a) having reinforcing fibers impregnated with a resin, and a base material (b) not impregnated with a resin, wherein
    at least two of the prepregs (a) are stacked in succession,
    both sides of the base material (b) are sandwiched by the prepregs (a), and
    satisfying VfA>VfB, wherein VfA is a volume fraction of fiber of a fiber-reinforced composite material layer (A) derived from each of the prepregs (a), and VfB is a volume fraction of fiber of a fiber-reinforced composite material layer (B) derived from the base material (b).

2. The fiber-reinforced composite material according to claim 1, wherein the fiber-reinforced composite material layer (B) contains a resin, and the resin impregnated in the fiber-reinforced composite material layer (B) is derived from a resin impregnated in each of the prepregs (a).

3. The fiber-reinforced composite material according to claim 1, wherein the volume fraction of fiber of the fiber-reinforced composite material layer (B) is 40% or less.

4. The fiber-reinforced composite material according to claim 2, wherein each of the fiber-reinforced composite material layers (A) present on both sides of the fiber-reinforced composite material layer (B) has a volume fraction of fiber of 55% or more.

5. The fiber-reinforced composite material according to claim 1, wherein a void content of the fiber-reinforced composite material layer (B) is higher than a void content of the fiber-reinforced composite material layer (A).

6. The fiber-reinforced composite material according to claim 1, wherein 80 to 100% of voids contained in the fiber-reinforced composite material layer (B) are distributed in a center portion of a cut surface on a plane cut along a stacking direction in the prepreg laminate.

* * * * *